United States Patent [19]

Kapala et al.

[11] Patent Number: 4,943,013
[45] Date of Patent: Jul. 24, 1990

[54] FASTENER SYSTEM FOR A JET ENGINE MOUNTING

[75] Inventors: Patrick Kapala, Claye Souilly; Jean-Pierre Mareix, Avon, both of France

[73] Assignee: Societe Nationale d'Etude et de Construction de Moteurs d-Aviation (SNECMA), Paris, France

[21] Appl. No.: 398,921

[22] Filed: Aug. 28, 1989

[30] Foreign Application Priority Data

Sep. 1, 1988 [FR] France .................. 88 11434

[51] Int. Cl.$^5$ .............................................. B64D 27/00
[52] U.S. Cl. ...................................... 244/54; 248/554; 411/339
[58] Field of Search .................. 244/54; 248/554–557; 411/120, 121, 132–135, 383, 339, 338

[56] References Cited

U.S. PATENT DOCUMENTS

| 3,703,741 | 11/1972 | Foster et al. | 411/339 |
| 3,831,888 | 8/1974 | Baker et al. | 244/54 |
| 4,065,077 | 12/1977 | Brooks | 244/54 |
| 4,079,981 | 3/1978 | Mahler et al. | 244/54 |
| 4,603,822 | 8/1986 | Chee | 244/54 |

FOREIGN PATENT DOCUMENTS 1345619 11/1963 France .
1562519 2/1969 France .
1605357 10/1974 France .
2565320 12/1985 France .

Primary Examiner—Galen Barefoot
Attorney, Agent, or Firm—Bacon & Thomas

[57] ABSTRACT

The present invention provides a fastener system for attaching a jet engine to a mounting bar requiring access to only one side of the mounting flanges. The fastener remains in place should either the bolt or the hollow pin fracture during operation of the engine. The fastener system has jet engine casing flanges extending on either side of a mounting bar with aligned openings extending through these elements. Hollow sleeves extend through the openings in each of the engine casing flanges with the rear, or downstream sleeve extending through the downstream flange having an internally threaded portion. A hollow pin passes through the interiors of the sleeves and the aperture in the mounting bar and engages the downstream sleeve such that rotation between this sleeve and the hollow pin is prevented. A bolt, having a headed portion, is inserted through the hollow pin at, and is threadingly engaged with, the threaded portion of the rear or downstream sleeve. The headed portion of the bolt bears against a headed portion on the hollow pin to hold the fastener assembly together. An anti-rotation device is applied between the headed portion of the hollow pin and the jet engine casing to prevent inadvertent rotation.

10 Claims, 4 Drawing Sheets

FASTENER SYSTEM FOR A JET ENGINE MOUNTING

BACKGROUND OF THE INVENTION

The present invention relates to a fastener system for attaching a turbojet engine casing to a mounting bar.

The general solution for fastening a turbojet engine to a mounting bar comprises forming flanges on the turbojet engine casing and passing a hollow pin through apertures in the flanges and a corresponding aperture in the mounting bar attached to the aircraft. The hollow pin may pass through sleeves retained in the apertures and be locked in position by a bolt passing through the hollow pin.

In typical known fastener systems, assembly and disassembly of the bolt passing through the hollow pin and holding the assembly together requires access to both ends of the bolt, located on opposite sides of the engine casing flanges. Typically, such access is extremely difficult due to the complex structure of the engine and requires a lengthy disassembly time to remove the engine from the mounting bar.

Attempts have been made to alleviate this problem. A typical example is illustrated in French Pat. No. 2,565,320 which discloses an engine mounting system wherein the bolt has a head portion that is eccentric with respect to the axis of its shank. The maximum radial dimension of the head is less than the inside diameter of the opening in the sleeves extending through the engine casing flanges, but greater than the diameter of the opening extending through the hollow pin. In this system, the bolt is passed through the aligned apertures of the mounting flanges and the mounting bar, and the hollow pin is passed over the shank of the bolt so as to also extend through these openings. The nut on the exposed end of the bolt is then applied and tightened to hold the system in place.

A drawback of this system is that the bolt must be placed into the sleeves and the openings prior to the insertion therethrough of the hollow pin, thus entailing the possibility of damaging the sleeves lining the openings. Also, if the bolt were to break during the operation of the engine, the broken bolt end may pull out of the assembly, no longer holding the hollow pin in place. Should the hollow pin slip out of the openings in either of the flanges or the mounting bar, the engine casing would be released from its suspension structure, possibly resulting in a catastrophic failure of the airframe.

SUMMARY OF THE INVENTION

The present invention provides a fastener system for attaching a jet engine to a mounting bar requiring access to only one side of the mounting flanges. The fastener system also remains in place should either the bolt or the hollow pin fracture during operation of the engine.

The fastener system according to the invention has jet engine casing flanges extending radially therefrom extending on either side of a mounting bar and defining aligned openings. Hollow sleeves extend through the openings or apertures in each of the engine casing flanges with the rear, or downstream, sleeve extending through the downstream flange having an internally threaded portion. A hollow pin passes thorough the interiors of the sleeves and the aperture in the mounting bar, and engages the rear or downstream sleeve such that rotation between this sleeve and the hollow pin is prevented. A bolt, having a headed portion, is inserted through the hollow pin and is threadingly engaged with the threaded portion of the rear, or downstream, sleeve. The headed portion of the bolt bears against a headed portion on the hollow pin to hold the fastener assembly together. An anti-rotation device is applied between the headed portion of the hollow pin and the jet engine casing to prevent inadvertent rotation of the pin.

The axial forces generated by the threading engagement between the bolt and the rear or downstream sleeve urges it into non-rotating contact with the hollow pin.

DETAILED DESCRIPTION OF THE PREFERRED EMBODIMENTS

Figure 3:
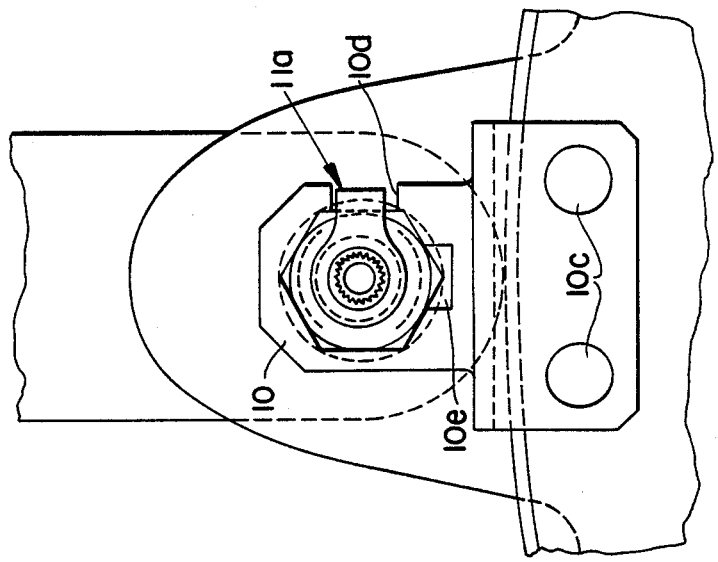
FIG. 3 is an end view of the fastener system shown in FIG. 1.
Figure 2:
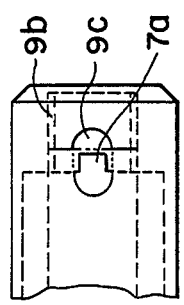
FIG. 2 is a partial, detailed view of the anti-rotation connection between the hollow pin and the sleeve shown in FIG. 1 viewed in the direction of arrow F.

FIGS. 1-4 illustrate a first embodiment of the fastener system according to this invention and show the turbojet engine casing 1 with a bifurcated upstream flange 2 and a bifurcated downstream flange 3 extending generally radially from the engine casing. Upstream flange 2 has generally radially extending leg portions 2a and 2b, while downstream flange 3 has generally radially extending leg portions 3a and 3b.

An engine mounting bar 4 is attached to the aircraft airframe structure (not shown) and extends between the upstream and downstream flanges 2 and 3, respectively. Mounting bar 4 has a swivel element 5 extending through an aperture in the mounting bar, the swivel member 5 also defining an opening therethrough. This opening is generally coaxial with openings 2c and 3c formed in the upstream and downstream flanges 2 and 3, respectively.

The fastener system also comprises an upstream sleeve 8 extending through the opening 2c in the upstream flange 2 and a downstream sleeve 9 extending through the opening 3c in the downstream flange 3. The downstream sleeve 9 has a radially extending shoulder 9a with an outer diameter greater than that of the opening 3c such that it bears against an upstream surface of the downstream flange 3. To enable the downstream sleeve 9 to be inserted into the opening 3c, the diameter of opening 2c must be slightly greater than that of the flange 9a. Sleeve 8 has a diameter slightly less than the opening 2c to enable it to be slidably received in this opening. Sleeve 9 also has a threaded portion 9b defining interior threads.

Figure 1:
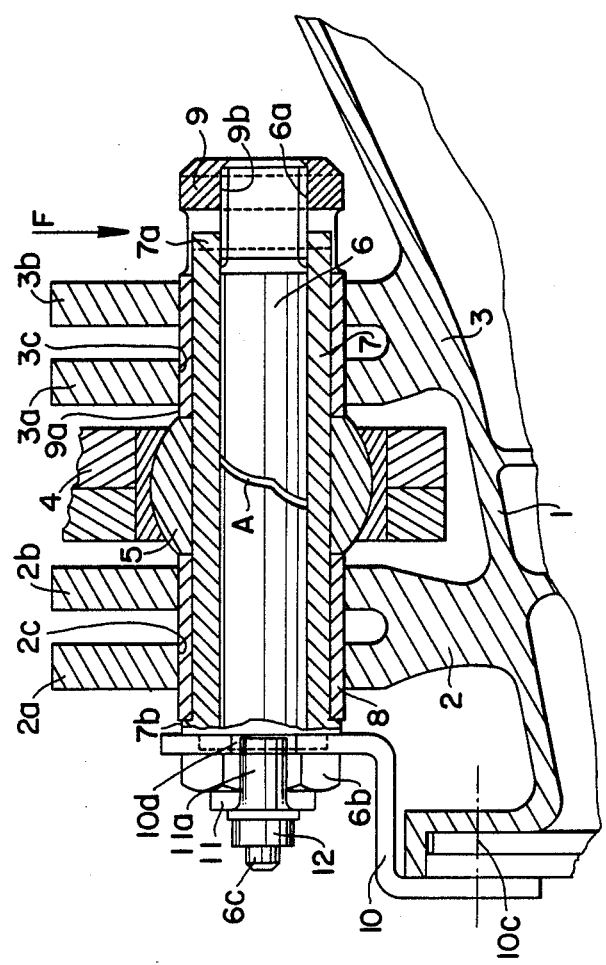
FIG. 1 is a cross-sectional view of a first embodiment of the fastener system according to the invention.

Hollow pin 7 extends through sleeves 8 and 9 as well as swivel element 5 as best seen in FIG. 1. Anti-rotation means are provided between the hollow pin 7 and the sleeve 9 to prevent any relative rotation between these elements. The anti-rotation means may comprise one or more studs 7a extending generally longitudinally from the end of the hollow pin 7 which engage a slot 9c extending radially across the downstream sleeve 9. Hollow pin 7 also has a radially extending shoulder 7b at its upstream end to bear against an upstream surface of the sleeve 8. The hollow pin 7 also has a head portion 7c with opposing flat surfaces 7d located on either side of its axis.

Bolt member 6 extends through the interior of the hollow pin 7 and has a threaded portion 6a which threadingly engages the threaded portion 9b of downstream hollow sleeve 9. Headed portion 6b of bolt 6 contacts an upstream surface of the head portion 7c of the hollow pin 7. Thus, as the bolt 6 is threadingly engaged with the downstream sleeve 9, the hollow pin 7 is urged into non-rotation engagement with the downstream sleeve 9, and both upstream sleeve 8 and downstream sleeve 9 are urged into contact with the swivel member 5.

Figure 4:
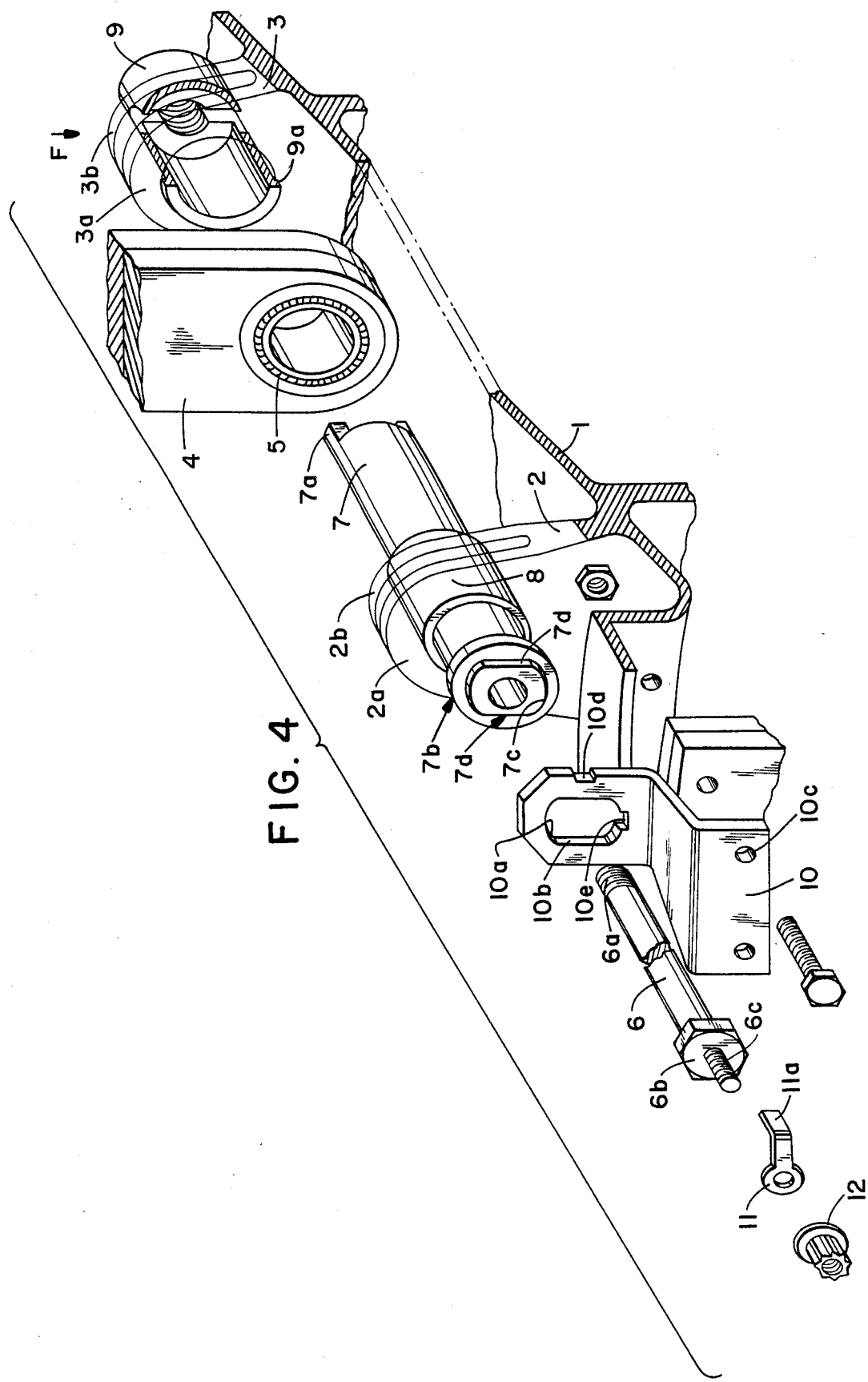
FIG. 4 is an exploded, perspective view of the fastener system shown in FIGS. 1-3.

The invention also includes anti-rotation means associated with the bolt 6 to prevent the bolt from becoming disengaged with the sleeve 9 during operation of the engine. This may be utilized in conjunction with an anti-rotation means interposed between the hollow pin 7 and the jet engine casing 1. This latter means may comprise a retaining lug 10 having a portion defining an opening 10a corresponding in cross-sectional shape to that of the head portion 7c of the hollow pin 7. As indicated in FIG. 4, opening 10a defines generally flat, parallel sides 10b which engage the sides 7d formed on head portion 7c. The retaining lug member is attached to a portion of the jet engine casing 1 via bolts or the like passing through apertures 10c.

Retaining lug 10 may also define notches 10d and 10e to accommodate the tab portion 11a of lock washer 11. The tab 11a bears against one of the flat sides of bolt head portion 6b and engages one of the notches 10d or 10e to prevent the bolt 6 from rotating relative to the hollow pin 7 and the retaining lug member 10. This prevents the inadvertent disengagement of the bolt 6 from the downstream sleeve 9 during operation of the engine. Lock washer 11 may be retained in contact with the head 6b of bolt 6 by nut 12 threaded onto portion 6c of the bolt 6.

In this embodiment of the invention, the assembly takes place as follows:

(a) Downstream sleeve 9 is passed through opening 2c and is placed in opening 3c in the downstream flange 3 and the upstream sleeve 8 is placed into the opening 2c in the upstream flange 2;

(b) The mounting bar 4 and the swivel member 5 are placed between the flanges 2 and 3 such that the opening through the swivel member is generally coaxial with the centers of the hollow sleeves 8 and 9;

(c) Hollow pin 7 is then inserted through the sleeves 8 and 9 until the studs 7a engage slot 9c and shoulder 7b bears against upstream sleeve 8;

(d) Retaining lug 10 is placed over the head portion 7c on the hollow pin 7 and is fastened to the jet engine casing 1;

(e) Bolt 6 is inserted through the hollow pin 7 and is threadingly engaged with threaded portion 9b such that one of the flat sides of the bolt head 6b is located near one of the notches 10d or 10e of the retaining lug 10;

(f) Washer 11 is placed over threaded portion 6c such that tab 11a contacts one of the flat surfaces of the bolt head 6b and engages one of the notches 10d or 10e; and, (g) Nut 12 is threadingly engaged with bolt portion 6c to retain the washer 11 in place.

Figure 6:
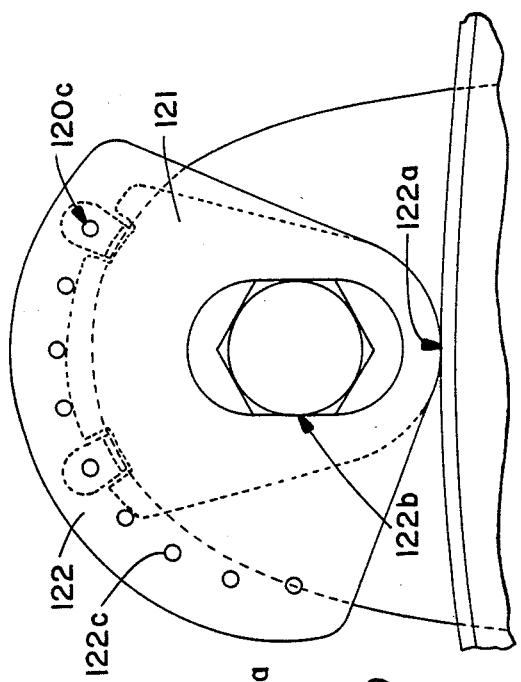
FIG. 6 is an end view of the fastener system shown in FIG. 5.
Figure 5:
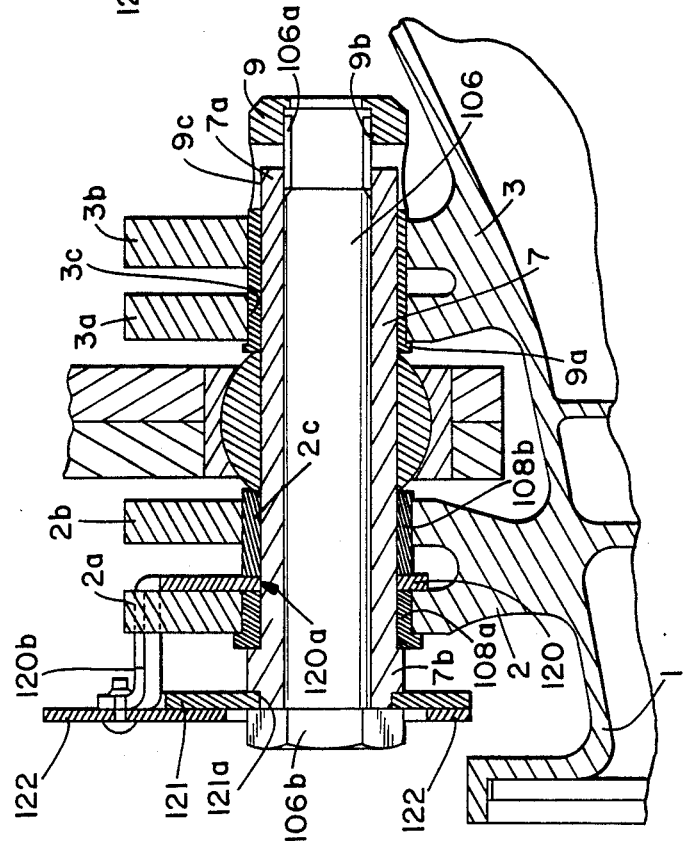
FIG. 5 is a cross-sectional view of a second embodiment of the fastener system according to the invention.
Figure 7:
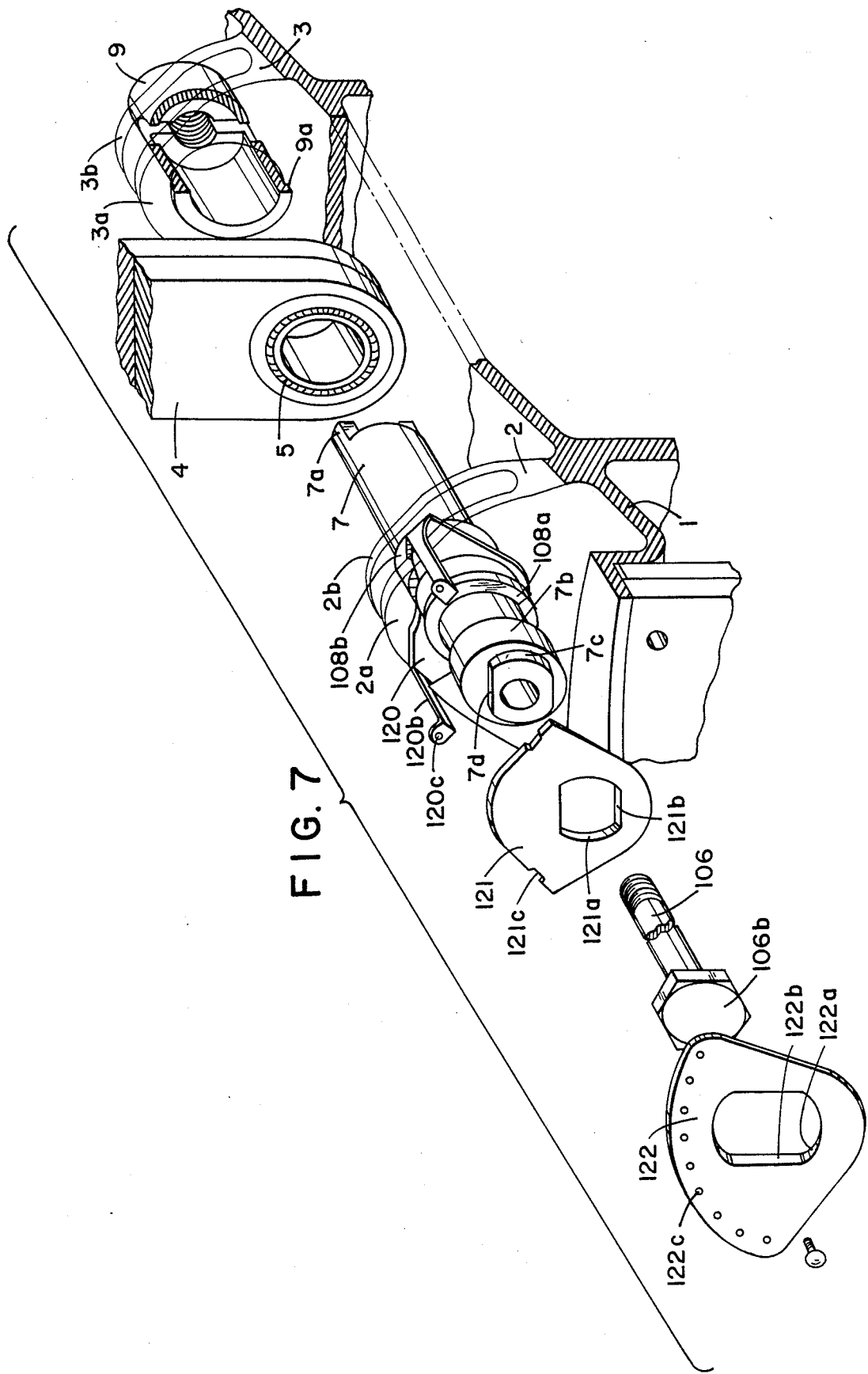
FIG. 7 is an exploded, perspective view of the fastener system shown in FIGS. 5 and 6.

An alternative embodiment is illustrated in FIGS. 5-7. The components common to the first embodiment are illustrated by the same numbers whereas the modified components are denoted by reference numerals increased by 100. In this embodiment, bolt 106 extends through the hollow pin 7 and is threadingly engaged with downstream sleeve 9 in the same fashion as the embodiment illustrated in FIGS. 1-4. In this embodiment, the anti-rotation means interposed between the hollow pin 7 and the jet engine casing 1 comprises a first locking plate 120 defining a bore 120a enabling the hollow pin 7 to pass through the plate 120. The upstream hollow sleeve may comprise upstream portion 108a and downstream portion 108b, and the plate 120 may be accommodated between these portions. Lugs 120b extend from plate 120 in a generally upstream, axial direction and bear against an outer surface of the leg 2a of the upstream flange 2. The interaction between the lugs 120b and the surface of the leg 2a prevent plate 120 from rotating relative to the flange 2. Each lug 120b defines an opening 120c, each opening 120c being the same distance from the axis of the hollow sleeve 7.

A second locking plate 121 defines an opening 121b having a cross-section similar in shape to that of the head portion 7c so as to slidably, but non-rotatably accommodate the head portion 7c therein. Plate 121 also defines notches 121c to accommodate the lugs 120b. Plate 121 is positioned over the head 7c of the hollow pin 7 and is prevented from rotating by the engagement of the lugs 120b with the notches 121c.

As best seen in FIG. 5, the head portion 106b of bolt 106 bears against a surface of the plate 121 to hold it in position against the head portion 7c of the hollow pin 7.

The means to prevent the rotation of the bolt 106 comprises locking plate 122 defining an opening 122a having generally parallel flat sides 122b to non-rotatably engage corresponding sides of the bolt head portion 106b. Locking plate 122 is retained in position by inserting screws or rivets through openings 122c and into openings 120c defined by lugs 120b. Locking plate 122 may define a plurality of openings 122c located along in a circular arc such that each opening has the same diameter as the openings 120c. The plurality of openings 122c may be located 15° apart whereas the openings 120c may be disposed 60° apart.

In this embodiment, bolt 106 is tightened such that at least two of the perforations 122c are in alignment with openings 120c and screws or rivets may be inserted through the aligned openings to lock the plate 122 to the plate 120.

In both of the embodiments of this invention, the fastener system can withstand rupture of either the bolt or the hollow pin and still maintain the connection between the engine casing and the mounting bar. If, as illustrated in FIG. 1, bolt 6 were to fracture at A, and even if the upstream part of the bolt 6 were to slip out of the hollow pin 7, the pin 7 would remain in position between retaining lug 10 and downstream sleeve 9.

Similarly, if the hollow pin 7 were to fracture, bolt 6 would remain in position due to its threaded engagement with hollow sleeve 9. In both cases, the fastener system remains operative without danger of misalignment.

The foregoing description is provided for illustrative purposes only and should not be construed as in any way limiting this invention, the scope of which is defined solely by the appended claims.

What is claimed is:

1. A fastener system for attaching a jet engine casing to a mounting bar such that the system may be attached and removed with access to only one side of the mounting bar, the system comprising:
   (a) Upstream and downstream flanges extending from the jet engine casing defining openings generally coincident with an opening defined by the mounting bar, the flanges being located on opposite sides of the mounting bar;
   (b) a first hollow sleeve member extending through the opening defined by the downstream flange, the hollow sleeve member defining a threaded portion;
   (c) a second hollow sleeve member extending through the opening defined by the upstream flange;
   (d) a hollow pin member having a head portion and a shaft portion extending through the opening defined by the mounting bar and into both sleeve members;
   (e) anti-rotation means interposed between the downstream hollow sleeve member and the hollow pin member to prevent relative rotation between these elements; and
   (f) bolt means extending through the hollow pin member and threadingly engaging the threaded portion of the downstream sleeve member, the bolt means having a headed portion bearing against the head portion of the hollow pin member such that tightening the bolt means urges the hollow sleeve members towards each other.

2. The fastener system according to claim 1 wherein the anti-rotation means comprises:
   (a) at least one stud protruding from the hollow pin member; and,
   (b) a slot defined by the downstream hollow sleeve member to accommodate the stud.

3. The fastener system according to claim 1 wherein the first hollow sleeve member further comprises a shoulder having a lateral dimension greater than that of the opening defined by the downstream flange such that the shoulder bears against a surface of the downstream flange.

4. The fastener system according to claim 1 wherein the head portion of the hollow pin member has a lateral dimension greater than that of the upstream hollow sleeve member such that the head portion bears against a portion of the upstream hollow sleeve member.

5. The fastener system according to claim 1 further comprising second anti-rotation means associated with the hollow pin member to prevent relative rotation between the hollow pin member and the jet engine casing.

6. The fastener system according to claim 5 wherein the head portion of the hollow pin member is non-circular and wherein the second anti-rotation means comprises:
   (a) a retaining lug member defining a bore having a non-circular cross-section corresponding in shape to the head portion of the hollow pin member so as to non-rotatably accept the head portion therein; and,
   (b) means to attach the retaining lug member to the jet engine casing.

7. The fastener system according to claim 6 further comprising third anti-rotation means interposed between the bolt means and the retaining lug member to prevent relative rotation between these elements.

8. The fastener system according to claim 7, wherein the third anti-rotation means comprises:
   (a) at least one notch defined by the retaining lug member; and,
   (b) a lock washer having a tab portion in contact with the headed portion of the bolt member and the at least one notch.

9. The fastener system according to claim 5 wherein the head portion of the hollow pin member has a non-circular cross-section and wherein the second anti-rotation means comprises:
   (a) a first locking plate non-rotatably contacting the upstream flange, the first locking plate having a plurality of lugs aaxially extending therefrom;
   (b) a second locking plate defining a non-circular opening adapted to non-rotatably engage the head portion of the hollow pin member; and,
   (c) a plurality of notches defined by the second locking plate to accommodate the lugs extending from the first locking plate to prevent relative rotation between the first and second locking plates.

10. The fastener system according to claim 9 further comprising:
   (a) a third locking plate adapated to non-rotatably engage the headed portion of the bolt means; and,
   (b) means to secure the third locking plate to the plurality of lugs to prevent relative rotation between the first and third locking plates.

* * * * *

UNITED STATES PATENT AND TRADEMARK OFFICE
CERTIFICATE OF CORRECTION

PATENT NO. : 4,943,013

DATED : July 24, 1990

INVENTOR(S) : KAPALA et al.

It is certified that error appears in the above-identified patent and that said Letters Patent is hereby corrected as shown below:

Column 6, line 35, "aaxially" should be --axially--.

Signed and Sealed this

Sixteenth Day of June, 1992

Attest:

DOUGLAS B. COMER

*Attesting Officer*

*Acting Commissioner of Patents and Trademarks*